US011868085B2

(12) United States Patent
Sato

(10) Patent No.: US 11,868,085 B2
(45) Date of Patent: Jan. 9, 2024

(54) IMAGE FORMING METHOD AND IMAGE FORMING SYSTEM

(71) Applicant: Konica Minolta, Inc., Tokyo (JP)

(72) Inventor: Yuya Sato, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 43 days.

(21) Appl. No.: 17/806,170

(22) Filed: Jun. 9, 2022

(65) Prior Publication Data

US 2022/0413405 A1 Dec. 29, 2022

(30) Foreign Application Priority Data

Jun. 24, 2021 (JP) ................................ 2021-104964

(51) Int. Cl.

*G03G 8/00* (2006.01)
*G03G 15/20* (2006.01)
*G03G 15/08* (2006.01)
*G03G 15/34* (2006.01)
*G03G 15/095* (2006.01)
*G03G 15/11* (2006.01)

(52) U.S. Cl.

CPC .......... *G03G 8/00* (2013.01); *G03G 15/0806* (2013.01); *G03G 15/095* (2013.01); *G03G 15/11* (2013.01); *G03G 15/2098* (2021.01); *G03G 15/342* (2013.01); *G03G 2215/00502* (2013.01); *G03G 2215/00607* (2013.01); *G03G 2215/00801* (2013.01); *G03G 2215/1666* (2013.01); *G03G 2221/1627* (2013.01)

(58) Field of Classification Search

CPC .... G03G 15/095; G03G 15/11; G03G 15/342; G03G 2215/00502; G03G 2215/00607; G03G 2215/00801; G03G 2215/1666; G03G 2221/1627; G03G 8/00; G03G 15/2098; G03G 15/0806

See application file for complete search history.

(56) References Cited

U.S. PATENT DOCUMENTS

2014/0255053 A1* 9/2014 Ohshika ............ G03G 15/6585 399/53
2016/0179046 A1* 6/2016 Sasaki ............... G03G 21/0094 399/346
2019/0155197 A1* 5/2019 Fujita ................ G03G 15/6585

FOREIGN PATENT DOCUMENTS

JP 2000-238344 A 9/2000

* cited by examiner

*Primary Examiner* — Joseph S Wong
(74) *Attorney, Agent, or Firm* — LUCAS & MERCANTI, LLP

(57) ABSTRACT

An image forming method for forming an image on a base material by using powder includes: attaching a protective material to a surface of the base material on which the image is to be formed; forming an attachment layer on at least one of the base material and the protective material attached to the base material; attaching the powder to the attachment layer after attaching the protective material; and removing excess powder attached to the protective material from the protective material without attaching to the attachment layer.

16 Claims, 5 Drawing Sheets

FIG. 7A
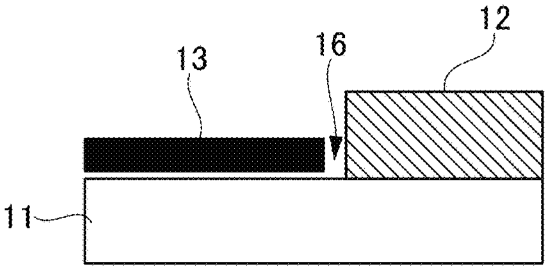
FIG. 7B
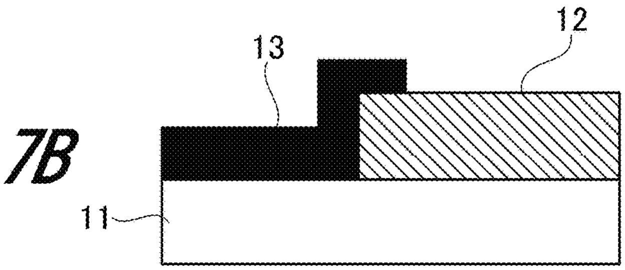
FIG. 7C
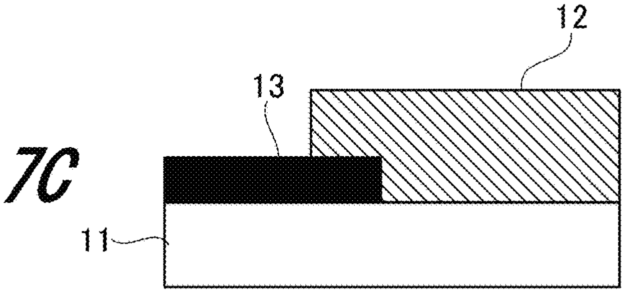
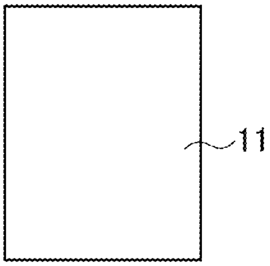
FIG. 8A
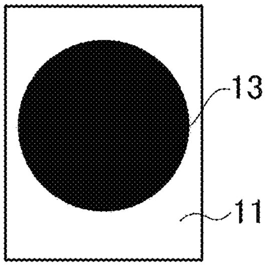
FIG. 8B
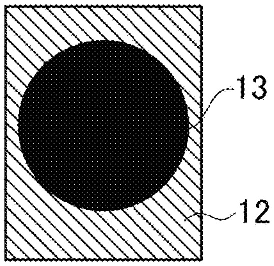
FIG. 8C
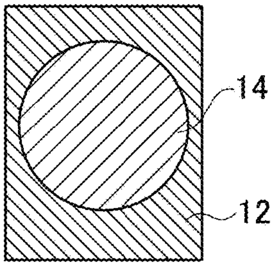
FIG. 8D

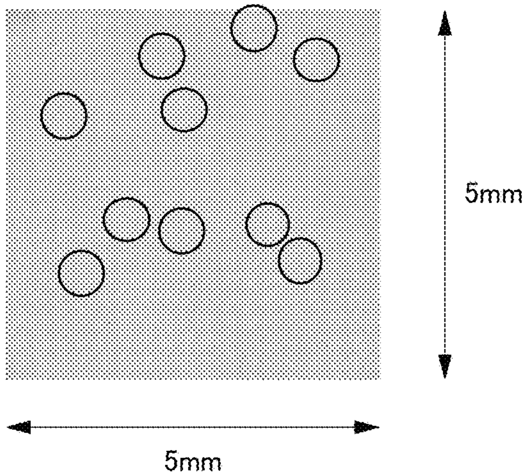
FIG. 9A
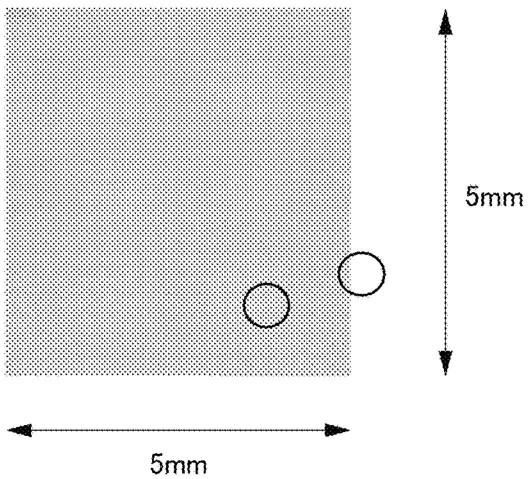
FIG. 9B
FIG. 10A
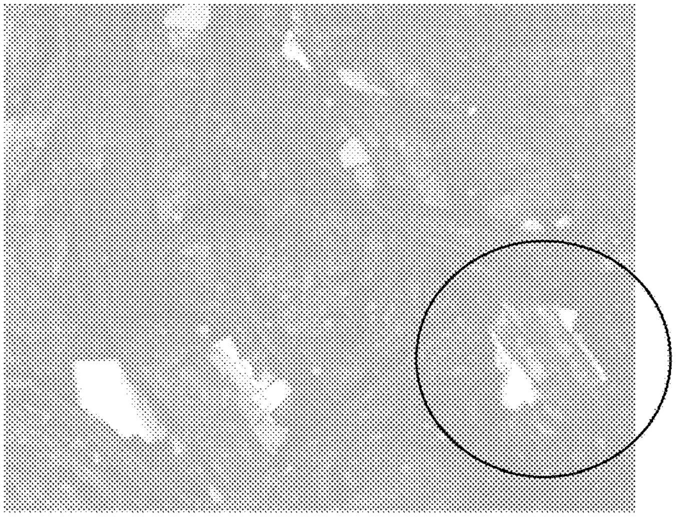
FIG. 10B
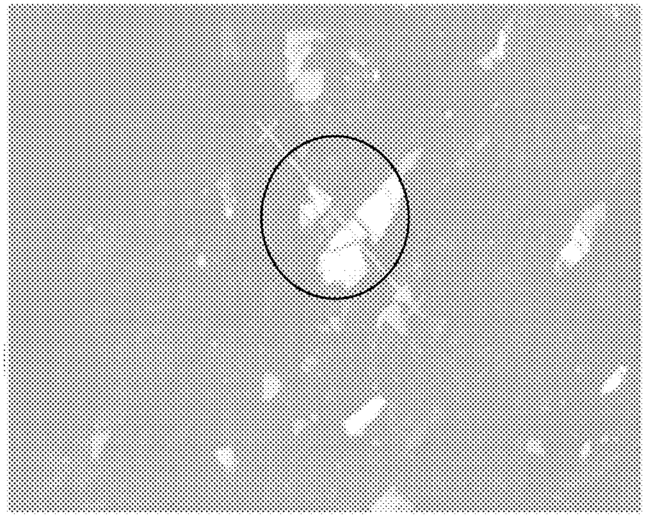

IMAGE FORMING METHOD AND IMAGE FORMING SYSTEM

CROSS-REFERENCE TO RELATED APPLICATIONS

The entire disclosure of Japanese patent Application No. 2021-104964, filed on Jun. 24, 2021, is incorporated herein by reference in its entirety.

BACKGROUND

Technological Field

The present invention relates to an image forming method and an image forming system for forming an image on a base material using powder.

Description of the Related Art

In recent years, demand for spot color printing and high-value added printing has increased in the on-demand printing market. Among them, demand for decorative printing such as metallic printing is particularly large, and a wide variety of studies have been conducted.

As one of methods for decorative printing, a method is known in which an image is formed on a base material with ink or toner, and powder is attached only to the image.

However, in the method of attaching the powder to the image, the powder may attach to a background portion where the image does not exist. Originally, since it is desired to supply powder only to the image portion to impart a desired appearance, the powder attached to such a background portion is excess powder. These excess powders are visually recognized as image noise as powder dirt in the background portion.

Patent Literature 1 proposes a method in which ink is landed on a surface of a recording medium, and powder is applied and thermally fixed before the ink is dried. Then, in Patent Literature 1, a remover that eliminates powder not attached to the ink is provided, and unnecessary powder is eliminated by the remover (for example, a brush or an air blow).

By providing such a remover, it is possible to almost eliminate the excess powder attached to the background portion, which causes image noise due to powder dirt.

RELATED ART LITERATURE

Patent Literature

Patent Literature 1: JP 2000-238344 A

SUMMARY

However, it has been difficult to eliminate all powders by a method of eliminating excess powder from a surface of a base material (recording medium, paper, etc.) like the method proposed in Patent Literature 1.

In addition, when the remover comes into contact with the base material or the remover applies a force for pushing the surface of the base material, the powder enters the fiber of the base material (paper) or the powder is pushed into the recess of the surface of the base material, so that these powders cannot be eliminated.

FIGS. 10A and 10B are photographs illustrating a state in which powder has entered the fiber of the base material.

As illustrated in FIGS. 10A and 10B, the powder has entered the fiber of the base material, and a relatively large powder has entered particularly at a portion surrounded by ○ in each photograph, and thus, it is considered that image noise increases.

In addition, in order to apply a force to contact the surface of the base material, it is necessary to bring the remover into close contact with the bumps and dips of the surface of the base material, but when the remover is brought into close contact with the surface of the base material at a high pressure, the surface of the base material may be damaged.

In order to solve the above-described problems, the present invention provides an image forming method and an image forming system capable of removing excess powder that causes image noise when an image is formed on a base material using powder.

An image forming method of the present invention is an image forming method for forming an image on a base material using powder. An image forming method of the present invention includes: attaching a protective material to a surface of a base material on which an image is to be formed; forming an attachment layer on at least one of the base material and the protective material attached to the base material; attaching powder to the attachment layer after attaching the protective material; and removing excess powder attached to the protective material from the protective material without attaching to the attachment layer.

An image forming system of the present invention is an image forming system for forming an image on a base material using powder.

An image forming system of the present invention includes: a protective material attachment device that attaches a protective material to a surface of a base material on which an image is formed; an attachment layer forming device that forms an attachment layer on at least one of the base material and the protective material attached to the base material; and a powder image forming device that forms a powder image by attaching powder to the attachment layer.

The powder image forming device further includes: a powder supplier that causes the powder to attach to the attachment layer; and a cleaner that removes excess powder attached to the protective material from the protective material without attaching to the attachment layer.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 7A to 7C are cross-sectional views illustrating a positional relationship between an attachment layer and a protective material;

FIGS. 8A to 8D are plan views illustrating an image forming method according to a second modification;

FIG. 9A is an observation image of A sample; FIG. 9B is an observation image of ○ sample; and FIGS. 10A and 10B are photographs illustrating a state in which powder has entered fiber of a base material.

DETAILED DESCRIPTION OF EMBODIMENTS

Figure 1:
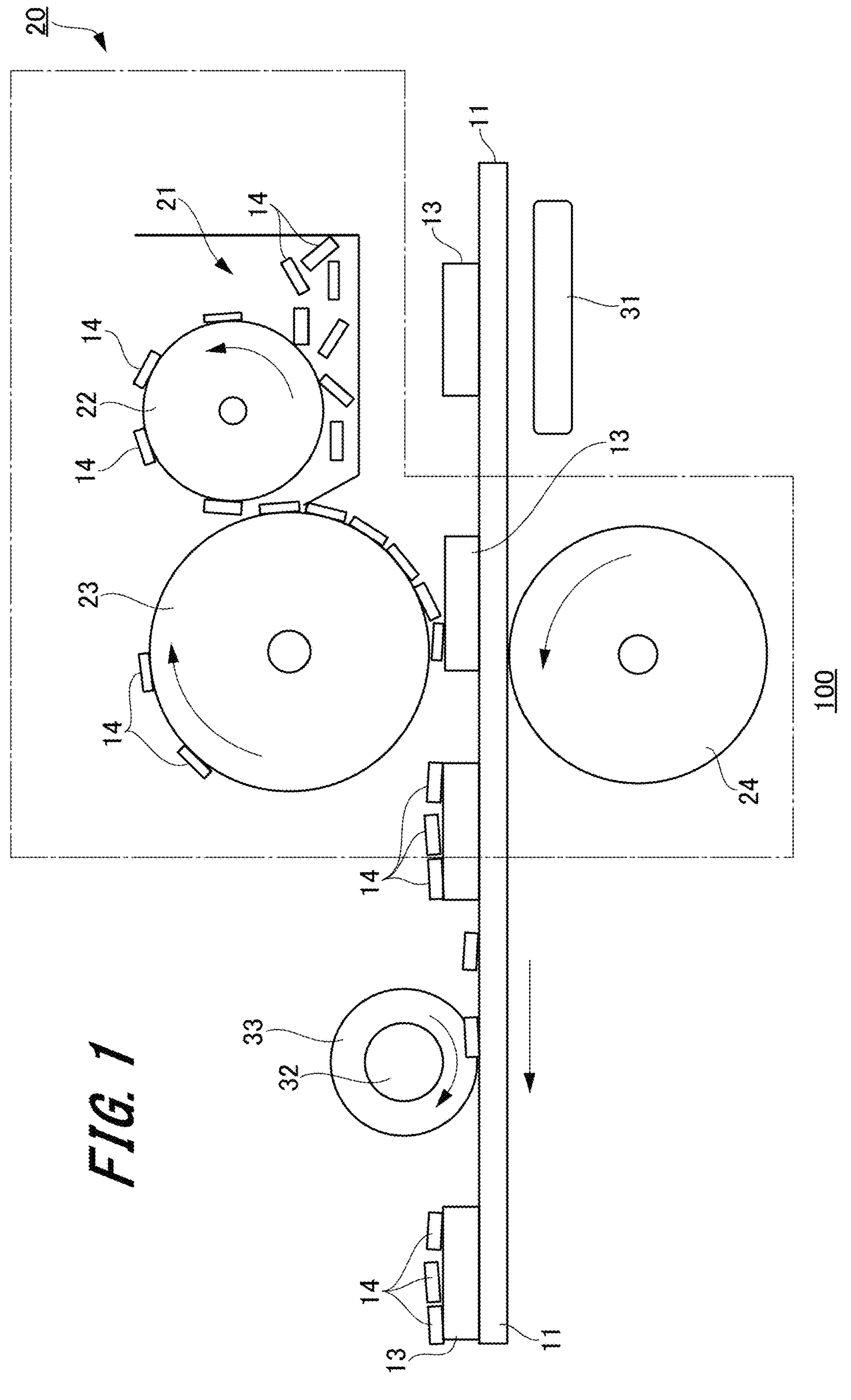
FIG. 1 is a schematic configuration diagram of one form of a powder image forming device according to a present invention.

Hereinafter, one or more embodiments of the present invention will be described with reference to the drawings. However, the scope of the invention is not limited to the disclosed embodiments.

An image forming method of the present invention is an image forming method for forming an image on a base material using powder. An image forming method of the present invention includes: attaching a protective material to a surface of a base material on which an image is to be formed; forming an attachment layer on at least one of the base material and the protective material attached to the base material; attaching powder to the attachment layer after attaching the protective material; and removing excess powder attached to the protective material from the protective material without attaching to the attachment layer.

An image forming system of the present invention is an image forming system for forming an image on a base material using powder.

An image forming system of the present invention includes: a protective material attachment device that attaches a protective material to a surface of a base material on which an image is formed; an attachment layer forming device that forms an attachment layer on at least one of the base material and the protective material attached to the base material; and a powder image forming device that forms a powder image by attaching powder to the attachment layer.

The powder image forming device further includes: a powder supplier that causes the powder to attach to the attachment layer; and a cleaner that removes excess powder attached to the protective material from the protective material without attaching to the attachment layer.

(Base Material)

In the image forming method and the image forming system of the present invention, the base material is a recording medium on which an image is recorded.

As the base material, paper, a resin film, or the like can be used.

In the present invention, the powder can be prevented from attaching to the base material by the protective material, and the generation of background portion image noise due to the powder entering the fiber of the base material can be prevented.

Therefore, according to the present invention, it is possible to obtain an image without background portion image noise even when using a base material into which powder easily enters, for example, high-quality paper or textured paper in which fibers are exposed without being subjected to coating treatment.

(Protective Material)

As the protective material according to the image forming method and the image forming system of the present invention, any protective material may be used as long as the protective material attaches to the base material and protects the base material of the background portion, and various protective materials can be used.

Note that the attachment force of the protective material to the base material may be larger than the force applied by the cleaner of the powder image forming device. That is, it is sufficient that the protective material is not peeled off from the base material by the force applied by the cleaner. When the protective material is peeled off, powder attaches to the base material exposed by the protective material being peeled off, resulting in background portion noise. This is to prevent this.

In addition, it is preferable that the protective material is not denatured or deformed by heating in attaching the powder to the attachment layer.

In attaching the powder to the attachment layer, the attachment layer (hot-melt material, toner) is in contact with the powder in a state where attachment force is developed by being heated. At this time, the protective material is also heated and is in contact with the powder. When the protective material is a thermoplastic material and is softened or melted at a heating temperature in the powder attachment step, the protective material may be denatured to increase the attachment force with the powder, or the surface may be deformed to be in close contact with the powder, so that the powder may attach to and be fixed to the protective material. When the powder attaches to the protective material, background portion image noise is generated. In order to prevent the surface of the protective material from being denatured or deformed in the powder attachment step, it is preferable to use a protective material in which the melting temperature Th of the protective material is higher than the melting temperature Tf of the attachment layer. Then, in the heating step, when the temperature of the base material is adjusted to a temperature higher than the melting temperature Tf of the attachment layer and lower than the melting temperature Th of the protective material, and the attachment layer is selectively melted, it is possible to prevent the remaining powder from firmly attaching to the protective material and becoming background portion image noise.

Examples of one form of the protective material include, for example, a sheet-like protective material. This sheet-like protective material can be used to adhere to the base material.

In addition, the protective material may be a film in which an adhesion layer is laminated on a sheet-like base material layer, and may attach to the base material by an adhesion force of the adhesion layer to act as a protective material.

The sheet-like protective material may be a colored film such as a gold foil film, but it is preferable that the sheet-like protective material is transparent or translucent without impairing the appearance of the base material. For example, a transparent foil or a laminate film can be used.

The sheet-like protective material can be attached to the entire surface of the base material on which an image is formed.

As another form of the protective material, the protective material may be adhered to the base material by supplying the protective material to the base material and curing the protective material.

As such a protective material, for example, an electrophotographic toner that is supplied to a base material by an electrophotographic process, then heated and pressurized, cured together with cooling, and fixed to the base material, an ultraviolet curable ink that is supplied to the base material, then cured by irradiation with an ultraviolet ray, and attached to the base material, a thermosetting ink that is supplied to the base material, then cured by heating, and attached to the base material, and the like can be used.

Any of the protective materials of toner or ink may be colored such as a color toner or a color ink, but it is preferable that the protective material is transparent or translucent without impairing the appearance of the base material, which is the same as the case of the film. For example, clear toner (transparent toner), clear ink, and clear varnish can be used.

The protective material such as the toner or the ink can be attached to either a partial region of the surface or the entire surface on the surface of the base material on which an image is formed.

When the protective material is attached to the entire surface of the base material on which an image is formed, the entire background portion is protected by the protective material, and background portion image noise can be reliably prevented on the entire surface.

The present invention is not limited to the above example, and any material that attaches to the base material and can protect the base material from the action of the cleaner of the powder image forming device can be used as a protective material.

(Attachment Layer)

The attachment layer fixes the powder on the base material.

As a material of the attachment layer, for example, toner can be used. Then, for example, when the toner is formed on the base material and then heated, the toner is softened or melted, and the powder attaches to the softened or melted toner.

Note that the attachment layer is not limited to the toner as long as it can be cured by temperature or light irradiation to fix the powder.

(Powder)

In the image forming method and the image forming system of the present invention, the powder is used to form an image constituted by the powder.

In the present invention, the powder used is a powder having such characteristics that an image can be formed by the powder. Examples of the characteristics of such a powder include a characteristic of exhibiting metallic luster in order to perform the metallic printing described above.

Examples of the powder having the characteristic of exhibiting metallic luster include powder of glitter pigment such as powder containing metal powder. The metal powder contains, for example, a metal such as aluminum, silver, platinum, chromium, nickel, rhodium, iron, gold, or copper.

The powder may be a synthetic product or a commercially available product.

The powder is formed of, for example, an aggregate of powder particles.

Examples of the powder particles include metal particles, resin particles, magnetic particles, and nonmagnetic particles.

The powder particles may be made of two or more different materials.

The powder may be a mixture of two or more different kinds of powder particles.

The powder particles constituting the powder may be coated. For example, the metal particles may be coated with a metal, a metal oxide, a resin, or the like different from the metal, or the surface of a resin, glass, or the like may be coated with a metal, a metal oxide, or the like.

The metal particles may be metal oxide particles, and the metal oxide particles may be coated with a metal oxide, a metal, a resin, or the like different from the metal oxide.

The metal particles may be particles obtained by spreading and pulverizing a metal or a metal oxide in a plate shape, particles obtained by coating the metal or the metal oxide with various materials, or particles obtained by vapor-depositing or wet-coating a metal or a metal oxide on a film or glass.

Note that the powder used in the present invention is different from the toner. The toner is obtained by attaching color particles to plastic particles having an electrification characteristic.

In particular, in the case of forming an image by powder using the characteristic of exhibiting metallic luster of the powder, it is preferable that the powder has a shape (non-spherical shape) that is not a true sphere.

The non-spherical powder preferably has a flat particle shape from the viewpoint of orienting and attaching the non-spherical powder along the surface of the attachment layer such as the toner layer. The "flat particle shape" of the non-spherical powder means a shape in which a ratio of a minor axis to a thickness is 3 or more, where a maximum length in a particle of the non-spherical powder is a major axis, a maximum length in a direction orthogonal to the major axis is a minor axis, and a minimum length in a direction orthogonal to the major axis is a thickness.

The thickness of the non-spherical powder is preferably 0.2 to 10 μm and more preferably 0.2 to 5.0 μm from the viewpoint of sufficiently exhibiting the appearance effect due to the oriented attachment of the non-spherical powder. If the thickness is too small, it is difficult to collect overlapped powders, and a good orientation state in which the planar direction of the non-spherical powder including the direction of the major axis and the direction of the minor axis of the non-spherical powder attached to the surface of the attachment layer is substantially along the surface direction of the attachment layer may not be sufficiently formed. Furthermore, the powder may be broken in the device and the size of the powder may change. Conversely, if the thickness is too large, powder may be removed when the image is rubbed.

The length of the major axis and minor axis of the non-spherical powder is preferably 1 to 50 μm, and more preferably 15 to 50 μm. If the major axis and the minor axis are too small, there is a concern that handling becomes difficult or the human body is affected. On the other hand, if the major axis and the minor axis are too large, the resolution of the image decreases, and the image has low gradation.

The material of the non-spherical powder is not particularly limited as long as it has such characteristics that the above-described image can be formed.

Specific examples of the powder having the characteristic of exhibiting metallic luster include SunshineBabe Chromium Powder, Aurora Powder, and Pearl Powder (all manufactured by GG Corporation), ICEGEL Mirror Metal Powder (manufactured by TAT Corporation), Pica-Ace MC Shine Dust, Effect C (manufactured by Kurachi Corporation; "Pica-Ace" is a registered trademark of the company), PREGEL Magic Powder, Mirror Series (manufactured by PREANFA Co., Ltd.; "PREGEL" is a registered trademark of the company), Bonnail Shine Powder (manufactured by KsPlanning Co., Ltd.; "BON NAIL" is a registered trademark of the company), METASHINE (manufactured by Nippon Sheet Glass Co., Ltd.; "METASHINE" is a registered trademark of the company), and LG neo (manufactured by OIKE & Co., Ltd.).

The above description has been given of the powder having the characteristic of exhibiting metallic luster, that is, the powder of the glitter pigment, but the present invention can also be applied to other powders other than the powder of the glitter pigment.

Examples of the other powders include a powder that gives an effect such as coloring other than metallic luster to the image, specifically, a powder of a fluorescent pigment or a powder of a pearlescent pigment.

In addition, the powder is not limited to a powder that gives an effect such as coloring to an image, and may be a functional powder that exhibits a function other than color development. The effect of the present invention is exhibited in any method of attaching the powder to the attachment layer on the base material.

Meanwhile, when the powder of the glitter pigment attaches to the background portion, the image noise of the background portion is easily recognized due to the glitter even if the number of attaching powders is small, and the present invention is more suitably used.

(Protective Material Attachment Step)

In the image forming method of the present invention, in attaching the protective material (protective material attachment step), the protective material is attached to the base material using, for example, a protective material attachment device.

In the image forming method of the present invention, the protective material attachment step is performed before attaching the powder to the attachment layer (powder image forming step).

Note that, prior to the protective material attachment step, it is also possible to perform forming an image other than the image (powder image) using the powder on the base material. Examples of the other image include a four-color toner image of the second example described later.

As described above, by performing forming another image on the base material prior to the protective material attachment step, the other image can be protected with the protective material, and background portion noise can be prevented even in an image with high added value in which the powder image and the other image are combined.

(Protective Material Attachment Device)

As the protective material attachment device according to the image forming method and the image forming system of the present invention, a device having various configurations can be used regardless of a method and a scheme as long as the device can supply and attach the protective material to the base material.

(Protective Material Attachment Device for Sheet-Like Protective Material)

As the protective material attachment device for attaching a sheet-like protective material (for example, a transparent foil or a laminate film), for example, a laminator device can be used.

Figure 2:
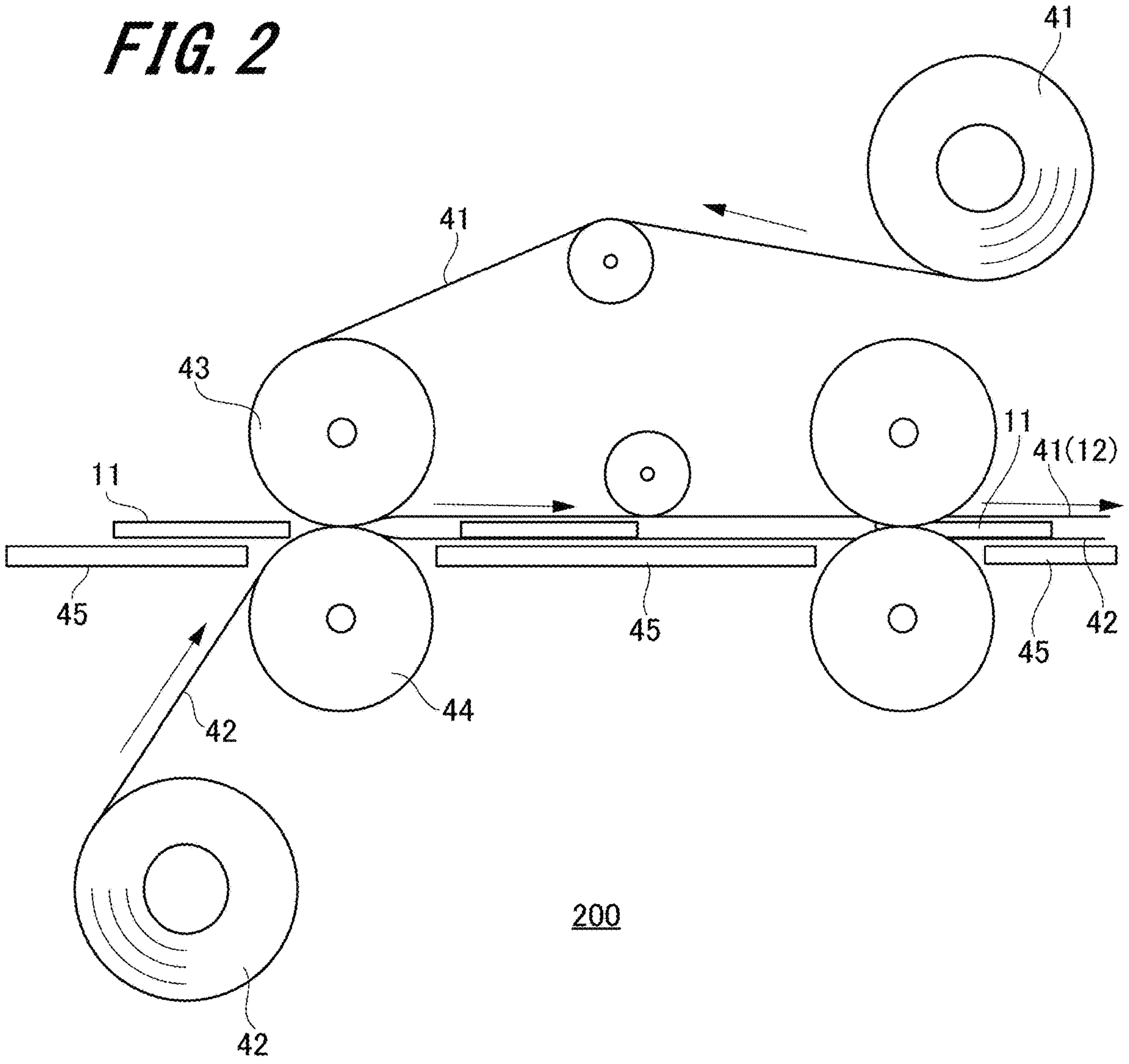
FIG. 2 is a schematic configuration diagram of one form of a laminator device which is a protective material attachment device.

FIG. 2 illustrates a schematic configuration diagram of one form of a laminator device.

A laminator device 200 illustrated in FIG. 2 includes a rolled laminate film (protective material) 41, a rolled backup film 42, a roller pair including an upper roller 43 and a lower roller 44, and a roller group that moves a base material 11 and the films 41 and 42. Note that, in the drawing, reference numeral 45 denotes a table that supports the base material 11 and the films 41 and 42.

The base material 11 moves from the left to the right in FIG. 2.

The laminate film (protective material) 41 is unwound from the roll and then supplied onto the base material 11 by the upper roller 43.

The backup film 42 is unwound from the roll and then supplied under the base material 11 by the lower roller 44.

Then, the upper roller 43 and the lower roller 44 of the roller pair are configured to be able to contact and pressurize each other, and the sheet-like protective material 41 and the base material 11 are superimposed and passed through the contact portions of the rollers 43 and 44, whereby the protective material 41 (12) is adhered to the base material 11 by the adhesion layer of the protective material 41.

In addition, there is known a type in which the protective material 41 using a thermoplastic material is prepared as the adhesion layer, and the roller pair 43 and 44 are made into a device capable of heating, whereby the adhesion layer heated at the contact portions of the roller pair 43 and 44 is softened and attaches to the base material 11, and the protective material 12 and the adhesion layer attach to the base material 11 by being cured together with cooling after passing through the contact portions of the roller pair 43 and 44.

Note that the backup film 42 is a film for preventing the adhesion layer of the laminate film (protective material) 41 from attaching to a roller group such as the lower roller 44.

Then, the backup film 42 is peeled off from the base material 11 in a portion (not illustrated) on the right side of the laminator device 200 of FIG. 2.

By peeling off the backup film 42 from the base material 11, the base material 11 to which the protective material 41 (12) is adhered is obtained.

In the above description of the laminator device 200, an example has been described in which the protective material 41 (12) is attached to a large area by the roller pair 43 and 44 for heating and pressurizing, but the present invention is not limited thereto.

A device that brings the adhesion layer of the protective material into close contact with the base material only by pressurization may be used, or a device that includes a thermal head that can be heated according to an input signal and selectively attaches the protective material by heating only a necessary portion of the base material may be used.

(Protective Material Attachment Device for Protective Material Such as Ink and Varnish)

For example, an inkjet device can be used as a device for attaching a protective material such as a clear ink or a clear varnish to a base material.

In an inkjet device, an inkjet head is arranged with a minute gap with respect to a base material, and an ink (varnish) droplet lands on the base material according to an input signal.

The landed ink is cured by cooling or light irradiation.

In the case of an ultraviolet curable ink (varnish), a UV light source that irradiates the ink (varnish) with an ultraviolet ray after landing is provided, and the ink (varnish) is cured by the irradiation of the ultraviolet ray.

By using the inkjet device, a protective material such as ink or varnish can be formed on a partial region of a surface of the base material on which an image is to be formed, or can be formed on the entire surface.

(Attachment Layer Forming Step)

In the image forming method of the present invention, in forming an attachment layer (attachment layer forming step), for example, an attachment layer, for example, the above-described toner or the like is formed on at least one of the base material and the protective material attached to the base material using an attachment layer forming device.

In forming the attachment layer (attachment layer forming step), the attachment layer is formed on any one of only the base material, only the protective material attached to the base material, and the base material and the protective material attached to the base material.

When the protective material is formed on the entire surface of the base material on which an image is to be formed in the protective material attachment step, an attachment layer is formed only on the protective material attached to the base material after the protective material attachment step.

When the protective material is formed on a part of the surface of the base material on which an image is to be formed in the protective material attachment step, the attachment layer forming step may be performed before or after the protective material attachment step, and the attachment layer is formed only on the base material or on the base material and the protective material attached to the base material. In this case, the protective material and the attachment layer are formed on the base material so as not to overlap each other, or one of the protective material and the attachment layer that is formed later is formed from the base material over the one formed earlier so as to partially overlap the one formed earlier.

Then, when the protective material and the attachment layer are formed on the base material so as not to overlap each other, control is performed so that a gap in which the base material is exposed is not generated between the protective material and the attachment layer as much as possible, and the protective material and the attachment layer are formed. When a gap in which the base material is exposed is generated, powder may attach to the exposed base material.

In addition, when one of the protective material and the attachment layer that is formed later is formed from the base material over the one formed earlier so as to partially overlap the one formed earlier, a gap in which the base material is exposed is not generated between the protective material and the attachment layer.

Forming the attachment layer (attachment layer forming step) can be performed, for example, by adopting an electrophotographic method.

(Attachment Layer Forming Device)

As the attachment layer forming device according to the image forming method and the image forming system of the present invention, a device having various configurations can be used regardless of a method and a scheme as long as the device can supply the attachment layer to at least one of the base material and the protective material attached to the base material to form the attachment layer.

As the attachment layer forming device, for example, an attachment layer forming device adopting an electrophotographic method such as AccurioPressC2060 manufactured by Konica Minolta, Inc. can be used.

(Powder Image Forming Step)

In the image forming method of the present invention, in attaching the powder to the attachment layer (powder image forming step), the powder is attached to the attachment layer using, for example, a powder image forming device.

(Removal Step)

In the image forming method of the present invention, in removing the excess powder attached to the protective material from the protective material without attaching to the attachment layer (removal step), for example, the excess powder is removed using a cleaner provided in the powder image forming device.

(Powder Image Forming Device)

As the powder image forming device according to the image forming method of the present invention and the image forming system of the present invention, a device having various configurations can be used regardless of a method and a scheme as long as the device can supply powder to the attachment layer and attach the powder to the attachment layer.

In addition, the powder image forming device desirably includes a cleaner that removes excess powder attached to the protective material from the protective material without attaching to the attachment layer.

As the cleaner of the powder image forming device, various configurations can be adopted regardless of a method and a scheme as long as excess powder attached to the protective material can be removed from the protective material.

Examples of the cleaner include a brush roller formed by winding a fiber made of PET, nylon, acrylic, or the like around a core metal to form a cleaning member.

Note that the powder image forming device, the protective material attachment device, and the attachment layer forming device may be independent devices, may be devices in which two or three devices are connected, or may be one device including two or three devices.

According to the image forming method of the present invention, since the powder is attached to the attachment layer after attaching the protective material to the surface of the base material on which an image is to be formed, a portion of the base material having no attachment layer is protected by the protective material, and excess powder is attached to the protective material without directly attaching to the base material.

Then, since the excess powder attached to the protective material without attaching to the attachment layer is removed from the protective material, the excess powder can be reliably removed.

An image forming system of the present invention includes a protective material attachment device that attaches a protective material to a surface of a base material on which an image is to be formed, an attachment layer forming device that forms an attachment layer on at least one of the base material and the protective material attached to the base material, and a powder image forming device that forms a powder image by attaching powder to the attachment layer. As a result, the protective material is attached to the base material by the protective material attachment device to protect the base material, and then a powder image is formed by the powder image forming device, so that the excess powder attaches to the protective material without directly attaching to the base material.

According to the image forming system of the present invention, since the powder image forming device further includes a powder supplier that causes the powder to attach to the attachment layer and a cleaner that removes the excess powder attached to the protective material from the protective material without attaching to the attachment layer, the excess powder attached to the protective material can be removed by the cleaner after the powder is attached by the powder supplier.

Hereinafter, specific embodiments of the image forming method and the image forming system of the present invention will be described with reference to the drawings and the like.

(Form of Powder Image Forming Device)

As a specific embodiment of the present invention, one form of the powder image forming device according to the present invention will be described.

FIG. 1 is a schematic configuration diagram of one form of the powder image forming device according to the present invention.

A powder image forming device 100 illustrated in FIG. 1 is a device that attaches powder 14 onto an attachment layer 13 formed on a base material 11 in a predetermined pattern.

As illustrated in FIG. 1, the powder image forming device 100 includes a supplier 20 in a region surrounded by an alternate long and short dash line, a heating member 31, and a cleaner including a core metal 32 and a cleaning member 33 around the core metal.

The supplier 20 includes a powder storage 21, a first supply member 22, a second supply member 23, and an opposing member 24 opposing the second supply member 23.

The powder 14 is stored in the powder storage 21 and delivered to the second supply member 23 while the first supply member 22 holds the powder 14. The powder 14 held by the second supply member 23 is oriented on the second supply member 23 by contact with the first supply member 22.

The thin layer of the powder 14 from which the excess powder 14 has been removed is supplied to the attachment layer (hot-melt material image) 13. The hot-melt material of the attachment layer 13 is heated by the heating member 31 and comes into contact with the powder 14 in a state in which attachment force is developed. The powder 14 on the second supply member 23 is brought into close contact with the attachment layer 13 (hot-melt material image) by the developed attachment force and pressurization. When there are a plurality of layers of powder 14 between the second supply member 23 and the attachment layer 13, the powder 14 pressurized on the second supply member 23 is different from the powder actually in contact with the attachment layer 13, so that adhesion failure may occur. Since the powder 14 is made in a thin layer on the second supply member 23 in advance, the powder 14 pressurized by the second supply member 23 directly comes into contact with the attachment layer 13, and the powder 14 attaches thereto.

Furthermore, assuming that the powder (excess powder) 14 attaches to a region (background portion) where the attachment layer (hot-melt material image) 13 on the base material 11 does not exist, the cleaning member 33 acts to collect the excess powder 14 in the background portion.

In the powder storage 21, a member (not illustrated) for stirring and conveying the powder 14 may be provided.

The first supply member 22 and the second supply member 23 may control the powder 14 by electrostatic force, magnetic force, adhesive force, or the like using various sponges, brushes, or solid rollers as long as the powder 14 can be held and delivered.

In the powder image forming device 100 of FIG. 1, the heating member 31 is heated without being in contact with the base material 11.

In the present invention, either a contact heating method or a non-contact heating method may be employed as long as the hot-melt member of the attachment layer can be heated.

For example, the opposing member 24 in FIG. 1 may also serve as a heating member.

As the cleaner, a brush roller can be used in which fibers made of PET, nylon, acrylic, or the like are wound around the core metal 32 to form the cleaning member 33.

As for the cleaning member of the cleaner, a plate-like member (not illustrated) may be brought into contact with the brush roller to remove the powder 14 held on the surface of the brush roller from the surface of the brush roller.

The powder attachment step of the powder attachment device is not limited to the method of bringing the powder 14 into contact with the attachment layer 13 from the second supply member 23 as illustrated in the powder image forming device 100 of FIG. 1. For example, a method may be used in which a driving force moving toward the base material is applied to the powder stored in the powder storage to bring the powder into contact with the base material and the attachment layer, and as the driving force, gravity acting on the powder, vibration by a piezoelectric element, or the like can be used.

The present invention is not limited to the method of the powder attachment step described above, and the effect of the present invention is exhibited in any method of bringing the powder into contact with the base material and the attachment layer.

EXAMPLES

Using the protective material and the powder, the protective material and an image of the powder were actually formed on the base material, and characteristics were examined.

(Base Material)

As the base material, the following paper, that is, POD gloss coat paper with a coated surface and npi high-quality paper in which paper fiber was exposed were used.

POD gloss coat paper 128 g A4 size manufactured by Oji Paper Co., Ltd.

npi high-quality paper 128 g A4 size manufactured by Nippon Paper Industries Co., Ltd.

(Protective Material)

As the protective material, a protective material formed on the entire surface of the base material on which an image is formed or a protective material formed on a part of the surface of the base material on which an image is formed (background portion of a powder image) was used.

As the protective material formed on the entire surface of the base material on which an image is formed, TOLAMI NS-PP mat manufactured by Tokyo Laminex Inc. was used.

As the protective material formed on a part of the surface of the base material on which an image is formed (background portion of a powder image), a UV varnish for JetVarnish3DS manufactured by MGI Digital Technology was used.

(Attachment Layer)

As the material of the attachment layer (hot-melt material), a toner (black) of AccurioPressC2060 manufactured by Konica Minolta, Inc. was used.

(Powder)

As the powder, LG neo #325 (manufactured by Hori Metal Leaf & Powder Co. Ltd.) was used. The LG neo is an insulating powder in which the surface of the metal layer is coated with a resin layer.

(Protective Material Attachment Device 1)

As the protective material attachment device 1, WIDE FORMAT LAMINATOR RSL-382S manufactured by Royal Sovereign was used. The heater set temperature on the upper roller side of the roller pair was 120° C., the heater set temperature on the lower roller side was 120° C., and the speed setting was 0.7 m/min.

(Protective Material Attachment Device 2)

As the protective material attachment device 2, JetVarnish3DS manufactured by MGI Digital Technology was used. The UV varnish landed on the base material was dried and cured by LED-UV incorporated in the device.

(Attachment Layer Forming Device)

As the attachment layer forming device, AccurioPressC2060 manufactured by Konica Minolta, Inc. was used.

(Powder Image Forming Device)

As the powder image forming device, a powder image forming device 100 having the configuration illustrated in FIG. 1 was used.

The first supply member 22 and the second supply member 23 are configured to hold and supply the powder 14 by adhesive force.

A nitrile rubber roller of Φ30 was used for the first supply member 22, and a silicone rubber roller of Φ60 was used for the second supply member 23 and the opposing member 24.

As the heating member 31, a plate heater (MPHK-V200-W150) was used to make contact from the back side of the base material 11.

As the cleaning member 33, a brush roller was used so as to be brought into contact with the excess powder 14 on the surface of the base material 11. The fiber was wound around the core metal 32 to form a brush roller, and the fiber was rotated in contact with the surface of the base material 11.

Then, the moving speed of the surface of the brush roller 33 was made higher than the moving speed of the base material 11 such that the rotation direction of the cleaning member (brush roller) 33 was the same direction as the moving direction of the base material 11, thereby applying a force for moving the powder 14 on the base material 11.

Then, by holding the powder 14 on the brush roller 33, the excess powder 14 was removed from the base material 11.

First Comparative Example

Figure 3A:
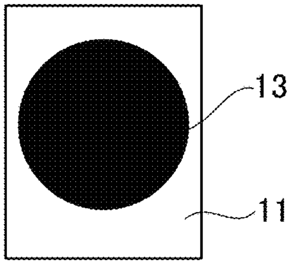
FIGS. 3A to 3C are plan views illustrating an image forming method according to a comparative example.

First, the base material 11 was passed through the above-described attachment layer forming device, and a toner image was printed on the base material 11 as the attachment layer 13. The printed toner image is illustrated in a plan view of FIG. 3A. As illustrated in FIG. 3A, the black toner forms the black circular attachment layer 13 at the center of white paper of the base material 11.

Next, the base material 11 on which the attachment layer 13 including the toner image was formed was passed through the powder image forming device 100 illustrated in FIG. 1. The powder 14 on the second supply member 23 attached to the toner (attachment layer) 13 inside the powder image forming device 100.

Figure 3B:
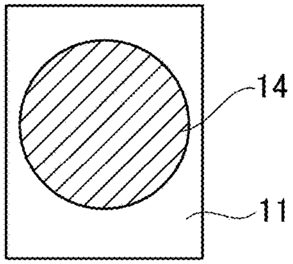

The printed powder image is illustrated in a plan view of FIG. 3B. As illustrated in FIG. 3B, the powder 14 is attached to a circular portion at the center.

Second Comparative Example

The powder image (FIG. 3B) formed in the first comparative example was passed through the above-described protective material attachment device 1, and the protective material 12 was attached to the base material 11 and the powder 14. The formed image is illustrated in a plan view of FIG. 3C.

Figure 3C:
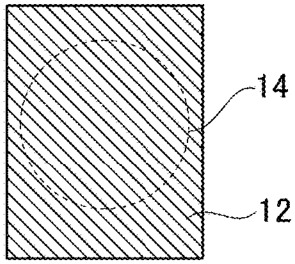

As illustrated in FIG. 3C, the protective material 12 was attached to the central circular powder 14.

First Example

Figure 4A:
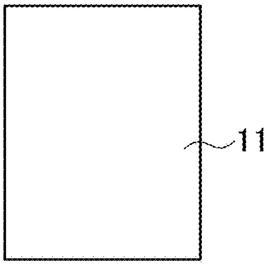
FIGS. 4A to 4D are plan views illustrating an image forming method according to a first example.
Figure 4B:
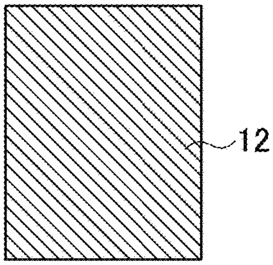

First, the base material 11 illustrated in a plan view of FIG. 4A was passed through the above-described protective material attachment device 1, and the protective material 12 was attached to the base material 11. The formed image is illustrated in a plan view of FIG. 4B. As illustrated in FIG. 4B, the protective material 12 is attached to the entire surface of base material 11.

Figure 4C:
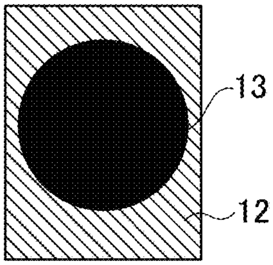

Next, the base material 11 to which the protective material 12 was attached was passed through the above-described attachment layer forming device, and a toner image was printed on the protective material 12 as the attachment layer 13. The printed toner image is illustrated in a plan view of FIG. 4C. As illustrated in FIG. 4C, the black toner forms the black circular attachment layer 13 at the center of the protective material 12 attached to the base material.

Figure 4D:
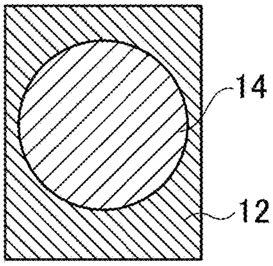

Next, the base material 11 having the toner image and the protective material 12 was passed through the powder image forming device 100 illustrated in FIG. 1. The powder 14 attached to the toner (attachment layer) 13 inside the powder image forming device 100. The printed powder image is illustrated in a plan view of FIG. 4D. As illustrated in FIG. 4D, the powder 14 is attached to a circular portion at the center.

Second Example

Figure 5A:
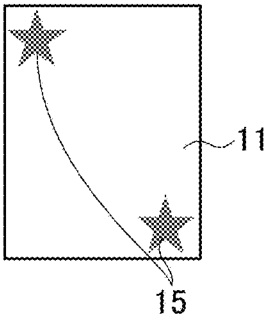
FIGS. 5A to 5D are plan views illustrating an image forming method according to a second example.

First, the base material 11 was passed through an image forming device. As the image forming device, Accurio-PressC6020 manufactured by Konica Minolta, Inc. was used to form a four-color toner image on the base material 11. The printed four-color toner image is illustrated in a plan view of FIG. 5A. As illustrated in FIG. 5A, a star-shaped toner image 15 was formed with four colors of toner on the upper left and lower right of the base material 11.

Figure 5B:
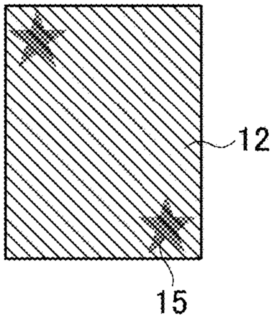

Next, the base material 11 having the toner image 15 was passed through the above-described protective material attachment device 1, and the protective material 12 was attached to the base material 11. The formed image is illustrated in a plan view of FIG. 5B. As illustrated in FIG. 5B, the protective material 12 is attached to the entire surface of the base material 11 including the top of the toner image 15 indicated by the star mark.

Figure 5C:
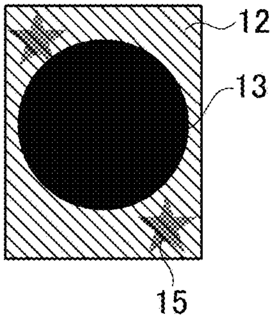

Next, the base material 11 having the toner image 15 and the protective material 12 was passed through the above-described attachment layer forming device, and the toner image was printed on the protective material 12 as the attachment layer 13. The printed toner image is illustrated in a plan view of FIG. 5C. As illustrated in FIG. 5C, the black toner forms the black circular attachment layer 13 at the center of the protective material 12 attached to the base material.

Figure 5D:
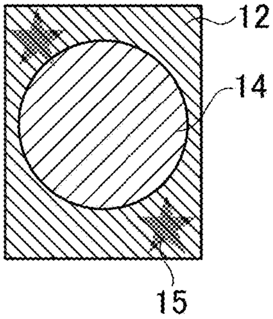

Next, the base material 11 having the toner image and the protective material 12 was passed through the powder image forming device 100 illustrated in FIG. 1. The powder 14 attached to the toner (attachment layer) 13 inside the powder image forming device 100. The printed powder image is illustrated in a plan view of FIG. 5D. As illustrated in FIG. 5D, the powder 14 is attached to a circular portion at the center. On the other hand, the powder 14 does not attach to the star-shaped toner image 15 protected by the protective material 12. As a result, an image in which the powder image and the four-color toner image are arranged in one plane as illustrated in FIG. 5D is formed.

(First Modification)

The first modification is an example in which the protective material attachment device 2 is used as another form of the first example.

Figure 6A:
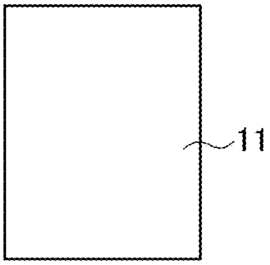
FIGS. 6A to 6D are plan views illustrating an image forming method according to a first modification.
Figure 6B:
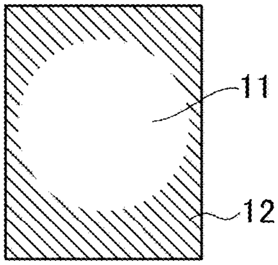

First, the base material 11 illustrated in a plan view of FIG. 6A was passed through the above-described protective material attachment device 2, and the protective material 12 was attached to the base material 11. The formed image is illustrated in a plan view of FIG. 6B. As illustrated in FIG. 6B, the protective material 12 was attached to a background portion on which an image is not formed in a subsequent step on the surface of the base material 11.

Figure 6C:
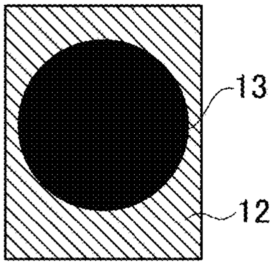

Next, the base material 11 having the protective material 12 was passed through the above-described attachment layer forming device, and a toner image was printed on the protective material 12 as the attachment layer 13. The printed toner image is illustrated in a plan view of FIG. 6C. As illustrated in FIG. 6C, the black toner forms the black circular attachment layer 13 in the central portion where the protective material 12 is not attached in the base material 11 where the protective material 12 is attached to the background portion.

Figure 6D:
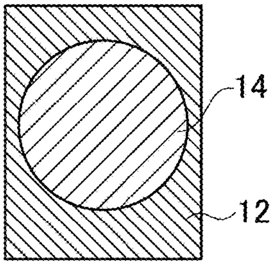

Next, the base material 11 having the toner image and the protective material 12 was passed through the powder image forming device 100 illustrated in FIG. 1. The powder 14 attached to the toner inside the powder image forming device 100. The printed powder image is illustrated in a plan view of FIG. 6D. As illustrated in FIG. 6D, the powder 14 is attached to a circular portion at the center.

Note that, in the first modification, specifically, the protective material 12 was attached so as to partially overlap an image (powder image) formed in a subsequent step.

Here, FIG. 7A illustrates a cross-sectional view in a case where the UV varnish is landed on the base material 11 as the protective material 12 so that the protective material 12 strictly attaches only to the background portion. As illustrated in FIG. 7A, a gap 16 may be formed between the attachment layer 13 by the toner image and the protective material 12 due to an error in sheet passing or the like. When the gap 16 is present as described above, since the base material 11 is exposed, the powder 14 attaches to the base material 11 exposed in the powder attachment step, which may cause background portion image noise.

On the other hand, FIG. 7B illustrates a cross-sectional view in a case where the UV varnish is landed on the base material 11 such that the protective material 12 attaches to an area wider than the background portion. As illustrated in FIG. 7B, even if there is an error in sheet passing, since the attachment layer 13 by the toner image attaches so as to partially cover (overlap) the protective material 12, no gap is generated, and the base material 11 is not exposed. As a result, background portion image noise is not generated.

(Second Modification) The second modification is an example in which the order of the protective material attachment step and the attachment layer forming step of the first modification is changed.

First, the base material 11 illustrated in a plan view of FIG. 8A was passed through the above-described attachment layer forming device, and a toner image was printed on the base material 11 as the attachment layer 13. The printed toner image is illustrated in a plan view of FIG. 8B. As illustrated in FIG. 8B, the black toner forms the black circular attachment layer 13 at the center of the white paper.

Next, the base material 11 having the toner image was passed through the above-described protective material attachment device 2, and the protective material 12 was attached to the base material 11. The formed image is illustrated in a plan view of FIG. 8C. As illustrated in FIG. 8C, the protective material 12 was attached to a background portion of the surface of the base material 11 where no toner image was formed.

Next, the base material 11 having the toner image and the protective material 12 was passed through the powder image forming device 100 illustrated in FIG. 1. The powder 14 attached to the toner inside the powder image forming device 100. The printed powder image is illustrated in a plan view of FIG. 8D. As illustrated in FIG. 8D, the powder 14 is attached to a circular portion at the center.

Specifically, the protective material 12 was attached so as to partially overlap the toner image (attachment layer) 13. FIG. 7C illustrates a cross-sectional view of base material 11 in a case where the UV varnish is landed such that protective material 12 attaches to an area wider than the background portion. As illustrated in FIG. 7C, since the partial protective material 12 is attached to the toner image (attachment layer) 13 so as to cover (overlap) the toner image, even if there is an error in sheet passing, no gap is generated, and background portion image noise is not generated.

(Method for Evaluating Background Portion Image Noise)

The background portion image noise of the powder adhesion image of each example formed as described above was evaluated by the following method.

The POD gloss coat paper 128 and the npi high-quality paper 128 paper were used for evaluation. However, in the first modification and the second modification, JetVarnish3DS manufactured by MGI Digital Technology, which was used as the protective material attachment device 2, did not support high-quality paper, and thus only the POD gloss coat paper 128 was evaluated.

The powder was placed on the laminated paper and rubbed with a microfiber cloth to spread the powder on the paper.

Furthermore, the powder on the paper was collected by rubbing with a microfiber cloth.

Then, by changing the number of rubs, samples in which the level of background portion image noise on the paper was changed were prepared, and sensory evaluation was performed on a plurality of persons. The sample in which 90% of the subjects answered that it was acceptable was regarded as "○ sample" as an OK level, and the sample in which 50% of the subjects answered that it was acceptable was regarded as "Δ sample".

FIG. 9A illustrates an observation image of the above-described Δ sample, and FIG. 9B illustrates an observation image of the above-described ○ sample. In each observation image, the observed powder is indicated by being surrounded by ○.

Then, the number of background portion attached powders was counted and calculated by the method described below.

Using a digital microscope VHX-6000 (manufactured by KEYENCE CORPORATION), a plurality of screens were observed in a mode of automatic image acquisition and combination, and images were stored at a view angle of 5 mm×5 mm. Then, the stored image was binarized by image processing software attached to the device, and then the number of powders included in the angle of view was automatically counted.

The number of background portion attached powders (unit: particles/$cm^2$) was calculated from the obtained number and area of the angle of view.

Three points were measured in each of the evaluation samples of each example, and the average value of the three points was taken as the number of background portion attached powders of each evaluation sample.

The number of background portion attached powders obtained by counting and calculating by the above method was 10 pieces/$cm^2$ for sample ○ and 80 pieces/$cm^2$ for sample Δ.

Based on this, the evaluation sample of each example was judged as "○" when the number of background portion attached powders was less than 10 particles/$cm^2$, "Δ" when the number of background portion attached powders was 10 particles/cm$^2$ or more and less than 80 particles/cm$^2$, and "x" when the number of background portion attached powders was 80 particles/cm$^2$ or more.

Note that, in the observation image of FIG. 9A, powder is observed in addition to the powder surrounded by ○, and the number of background portion attached powders is measured at three points including the illustrated observation image, and an average value is obtained. Therefore, the value of the number of background portion attached powders is different from the calculated value obtained from the number of ○ of the illustrated observation image and the area of the observation image.

Table 1 illustrates the printing process order and evaluation results of the evaluation sample background portion image noise of each comparative example, each example, and each modification.

TABLE 1

| | Printing process order | | | | Evaluation results Paper type | |
|---|---|---|---|---|---|---|
| | | | | | POD | npi |
| | 1 | 2 | 3 | 4 | gloss coat | high-quality |
| Comparative example 1 | Attachment layer forming device AccurioPressC6020 | Powder image forming device | | | Δ | x |
| Comparative example 2 | Attachment layer forming device AccurioPressC6020 | Powder image forming device | Protective material attachment device 1 RSL-382S | | Δ | x |
| Example 1 | Protective material attachment device 1 RSL-382S | Attachment layer forming device AccurioPressC6020 | Powder image forming device | | ○ | ○ |
| Example 2 | Four-color image forming device AccurioPressC6020 | Protective material attachment device 1 RSL-382S | Attachment layer forming device AccurioPressC6020 | Powder image forming device | ○ | ○ |
| Modification 1 | Protective material attachment device 2 JetVarnish3DS | Attachment layer forming device AccurioPressC6020 | Powder image forming device | | ○ | — |
| Modification 2 | Attachment layer forming device AccurioPressC6020 | Protective material attachment device 2 JetVarnish3DS | Powder image forming device | | ○ | — |

In the first comparative example, the protective material attachment step was not performed. Therefore, in the powder image forming step inside the powder image forming device, the powder comes into contact with the exposed base material. Therefore, after the removal step, the powder remained in the paper recess on the surface of the POD gloss coat paper, and background portion image noise was generated. In the npi high-quality paper 128, background portion image noise further deteriorated.

When observed with a microscope, the powder has entered the paper fiber as illustrated in FIGS. 10A and 10B.

Cleaning by rubbing with a microfiber cloth and cleaning by bringing a sticky rubber surface into contact with these images were attempted, but the powder remaining in the recess and the powder entering the paper fiber were not able to be removed.

In the second comparative example, since the protective material attachment step by the laminator was provided after the powder image forming step, the powder comes into contact with the exposed base material in the powder image forming step. For this reason, powder pushed into the recess and powder entering the paper fiber were generated after the removal step, and background portion image noise was generated. Furthermore, in the second comparative example, since the protective material was attached onto the powder that has entered the paper fiber, it was not possible to remove the powder.

In the first example, the protective material attachment step by the laminator was provided before the attachment layer forming step and the powder image forming step. Therefore, in the powder image forming step, the laminate comes into contact with the powder, and the powder does not come into contact with the base material. Then, even if the powder attached to the laminate, the powder was not pushed into the recess in the removal step, and background portion image noise was not generated. It was also possible to remove slightly remaining powder by rubbing the surface of the laminate with a macrofiber cloth.

In the first example, since the entire surface of the base material is protected by the laminate, there is no risk that the base material is exposed, and background portion image noise can be reliably prevented. In addition, it is possible to easily configure the protective material attachment device as compared with a case where the protective material is attached only at a desired position according to the input signal.

In the first example, even when the npi high-quality paper 128 having deteriorated background portion image noise in the first comparative example and the second comparative example was used as the base material, since the paper fiber was protected in the powder attachment step, the powder did not enter the paper fiber, and background portion image noise was not generated.

In the second example, the protective material attachment step by the laminator was provided before the attachment layer forming step and the powder image forming step. Therefore, the laminate was in contact with the powder, the powder was not in contact with the base material, and background portion image noise was not generated. As illustrated in FIG. 5D, it was possible to obtain an image in which background portion image noise is not generated even in an image in which the four-color toner image and the powder image are arranged in one plane.

In the first modification, the protective material attachment step with UV varnish was provided before the attachment layer forming step and the powder image forming step.

Therefore, in the powder image forming step, the toner comes into contact with the powder in the image portion, the UV varnish comes into contact with the powder in the background portion, and the powder does not come into contact with the base material. For this reason, even if the powder attached to the UV varnish, the powder was not pushed into the recess in the removal step, and background portion image noise was not generated. It was also possible to remove slightly remaining powder by rubbing the surface of the UV varnish with a macrofiber cloth.

In the first modification, since the protective material is attached only to a necessary portion, the use area of the protective material can be reduced, that is, the consumption amount of the protective material can be reduced.

In the second modification, the protective material attachment step with UV varnish was provided after the attachment layer forming step and before the powder image forming step. In the powder image forming step, the toner comes into contact with the powder in the image portion, the UV varnish comes into contact with the powder in the background portion, and the powder does not come into contact with the base material. For this reason, even if the powder attached to the UV varnish, the powder was not pushed into the recess in the removal step, and background portion image noise was not generated. It was also possible to remove slightly remaining powder by rubbing the surface of the UV varnish with a macrofiber cloth.

Since it is important that the protective material attaches to the background portion in the powder image forming step, the protective material attachment step may be performed before or after the attachment layer forming step as long as the protective material attachment step is before the powder image forming step.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS

11 . . . base material
12 . . . protective material
13 . . . attachment layer
14 . . . powder
15 . . . toner image
16 . . . gap
20 . . . supplier
21 . . . powder storage
22 . . . first supply member
23 . . . second supply member
24 . . . opposing member
31 . . . heating member
32 . . . core metal
33 . . . cleaning member
41 . . . laminate film (protective material)
42 . . . backup film
43 . . . upper roller
44 . . . lower roller
100 . . . powder image forming device
200 . . . laminator device

The invention claimed is:

1. An image forming method for forming an image on a base material using powder, the image forming method comprising:

attaching a protective material to a surface of the base material on which the image is to be formed;

forming an attachment layer on at least one of the base material and the protective material attached to the base material;

attaching the powder to the attachment layer after attaching the protective material; and removing excess powder attached to the protective material from the protective material without attaching to the attachment layer.

2. The image forming method according to claim 1, wherein the protective material is transparent or translucent.

3. The image forming method according to claim 1, wherein the protective material is attached to an entire surface of the base material on which the image is formed.

4. The image forming method according to claim 1, wherein before attaching the protective material, forming an image other than the image using the powder on the base material is performed.

5. The image forming method according to claim 1, comprising heating the base material and the attachment layer, the attachment layer being a hot-melt material, wherein in attaching the powder to the attachment layer, the powder is attached to the attachment layer melted by heating, the protective material has a melting temperature Th higher than a melting temperature Tf of the attachment layer, and in heating, a temperature of the base material is adjusted to a temperature higher than the melting temperature Tf of the attachment layer and lower than the melting temperature Th of the protective material to selectively melt the attachment layer.

6. The image forming method according to claim 1, wherein the base material is high-quality paper or textured paper in which fibers are exposed.

7. The image forming method according to claim 1, wherein the powder is a glitter pigment.

8. The image forming method according to claim 1, wherein the protective material is a film in which an adhesion layer is laminated on a sheet-like base material layer, and is attached to the base material by heating and pressurizing.

9. The image forming method according to claim 1, wherein the protective material is a transparent toner, is supplied to the base material by an electrophotographic process, and is fixed to the base material by heating in a fixing process.

10. The image forming method according to claim 1, wherein the protective material is an ultraviolet curable or thermosetting ink, and is supplied to the base material, then cured by ultraviolet irradiation or heating, and attached to the base material.

11. An image forming system for forming an image on a base material using powder, the image forming system comprising:

a protective material attachment device that attaches a protective material to a surface of the base material on which the image is to be formed;

an attachment layer forming device that forms an attachment layer on at least one of the base material and the protective material attached to the base material; and a powder image forming device that forms a powder image by attaching the powder to the attachment layer, wherein the powder image forming device includes a powder supplier that causes the powder to attach to the attachment layer and a cleaner that removes excess powder attached to the protective material from the protective material without attaching to the attachment layer.

12. The image forming system according to claim 11, wherein the protective material attachment device causes the protective material to attach to an entire surface of the base material on which the image is formed.

13. The image forming system according to claim 11, wherein the attachment layer is a hot-melt material, the protective material has a melting temperature Th higher than a melting temperature Tf of the attachment layer, and the powder image forming device further includes a heating member that heats the base material and the attachment layer, adjusts the temperature of the base material to a temperature higher than the melting temperature Tf of the attachment layer and lower than the melting temperature Th of the protective material, and selectively melts the attachment layer to attach the powder to the attachment layer melted by heating.

14. The image forming system according to claim 11, wherein the protective material is a film in which a transparent base material layer and an adhesion layer are laminated, and the protective material attachment device heats and pressurizes the protective material to attach the protective material to the base material.

15. The image forming system according to claim 11, wherein the protective material is a transparent toner, and the protective material attachment device supplies the protective material to the base material by an electrophotographic process, and fixes the protective material to the base material by heating in a fixing process.

16. The image forming system according to claim 11, wherein the protective material is an ultraviolet curable or thermosetting ink, and the protective material attachment device supplies the protective material to the base material by an ink printing process, and cures the protective material by ultraviolet irradiation or heating to attach the protective material to the base material.

* * * * *